UNITED STATES PATENT OFFICE.

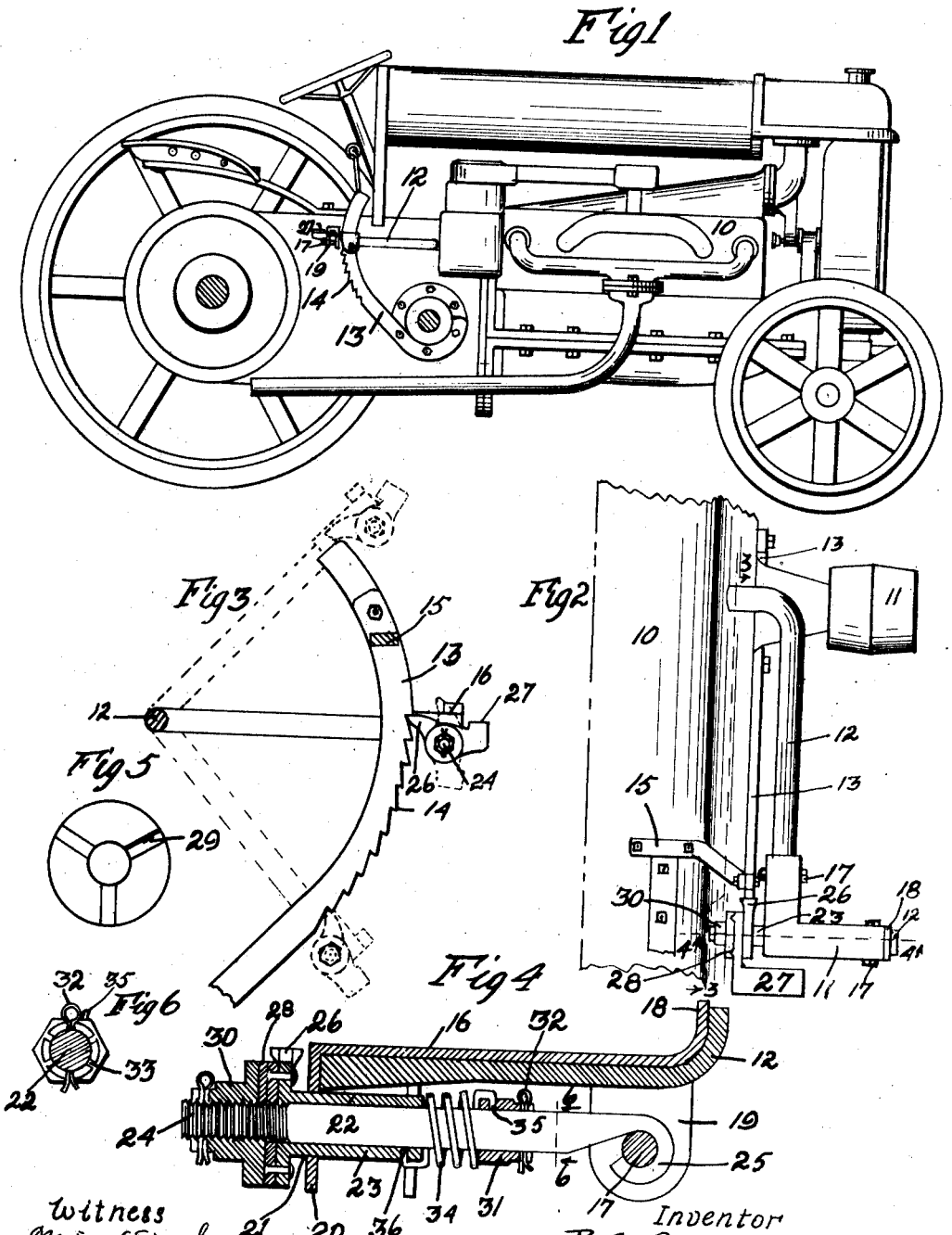

BURTON A. SPINNEY, OF DES MOINES, IOWA.

CLUTCH CONTROL FOR TRACTORS.

1,341,222. Specification of Letters Patent. Patented May 25, 1920.

Application filed May 8, 1919. Serial No. 295,756.

*To all whom it may concern:*

Be it known that I, BURTON A. SPINNEY, a citizen of the United States, and resident of Des Moines, in the county of Polk and State of Iowa, have invented a certain new and useful Clutch Control for Tractors, of which the following is a specification.

The object of my invention is to provide a clutch control lock device of simple, durable and inexpensive construction.

More particularly it is my object to provide a means whereby an operating lever for the clutch may be selectively locked against movement in one direction so as to render the clutch inoperative.

A further object is to provide a clutch control whereby the clutch control lever may be yieldingly locked against movement in one direction.

Still a further object is to provide a clutch control lever locking device having a notched sector and pawl yieldingly held in engagement with said notches, and means whereby the pawl may be held in inoperative position relative to said notches.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a tractor with my improved clutch locking device attached.

Fig. 2 shows a top view of the clutch locking device.

Fig. 3 shows a sectional view taken on the line 3—3 of Fig. 2.

Fig. 4 shows a central sectional view through the locking device taken on the line 4—4 of Fig. 2.

Fig. 5 shows a side elevation of the part having the recesses therein; and

Fig. 6 shows a sectional view taken on the line 6—6 of Fig. 4.

In the accompanying drawings I have used the reference numeral 10 to indicate generally the tractor, and 11 a pulley wheel. The numeral 12 indicates a clutch control lever designed when in one position to hold the clutch in engagement.

Fixed to the tractor is a sector 13, having notches 14 therein. The sector is fixed at its upper end by means of a bracket 15.

Fixed on the lever 12 is a foot rest 16. The foot rest 16 is bolted to the lever by means of bolts 17. The foot rest 16 has an upwardly projecting portion 18 designed to prevent the foot from slipping off the foot rest. The foot rest 16 has the downwardly projecting ears 19, through which the bolts 17 pass.

The foot rest has a downwardly extending portion 20 having an annular opening 21 therein. A shaft 22 having a sleeve 23 thereon is permitted to pass through the opening 21, said shaft having a screw-threaded portion 24 at one end and a yoke 25 at its other end. The yoke 25 passes around the bolt 17.

Fixed on the sleeve 23 is a pawl 26. Adjacent to the pawl member 26 and secured thereto is a foot actuated member 27. The foot actuated member 27 has a plurality of outwardly extending projections 28, which are designed to be received in the recesses 29 of the nut 30.

Loosely fixed on the shaft is a lock nut 31, held against rotation by a cotter pin 32. The nut 31 has a plurality of slotted openings 33 therein. Mounted on the shaft 22 is a spring 34 having its ends fixed to the nut 31 at 35 and to the sleeve 23 at 36.

In the practical operation of my device the bolts 17 are detached and the locking device is placed over the foot rest of the clutch control lever, and the bolts are then placed in position so as to hold the locking device on the lever. The notched sector is fixed to the tractor adjacent to the locking device of the lever control.

It will be seen that the normal position of the lever is for holding the clutch in engagement, and in order to hold the clutch out of engagement it is necessary to lock the clutch in position substantially as shown by the lower dotted lines in Fig. 3. The pawl 26 will engage the notches 14, and thereby prevent the clutch lever from moving to its normal position unless some positive means is provided for releasing the pawl from engagement with said notches. The pawl is yieldingly held in engagement with the notches, and in order to move the pawl from engagement with the notches it requires the downward movement of the member 27 so as to change the relative position of the projecting lugs 28 relative to the grooves 29. The spring 34 yieldingly holds the lugs 28 in engagement with the recesses 29, and when the projections 28 are not in engagement with the recesses the spring will tend to force the projection into a recess; but after the relative position of one projection to a recess is made, the spring will hold the projection into the changed recess.

The position of the pawl when it is positively out of engagement with said notches is shown by the dotted lines in Fig. 3.

It will be seen that it requires practically one-third of a revolution of the pawl member 26 in order to change the position of the projection relative to one of the recesses 29.

It will be seen that when the projections are not received in the recesses that the spring will normally tend to throw the pawl forward, thereby insuring always that the projections will be received in the recesses, thereby insuring the pawl to be in engagement with the notches of the sector. When the pawl is yieldingly held in engagement with the notches, and the clutch lever is moved downwardly, the projections 28 will move slightly out of their recesses and tend to tighten the spring 34, but as soon as the pawl passes one of the projections the spring 34 will move the pawl forward, thereby bringing the projections into the recesses.

By this device the clutch lever may be locked in a position to render the clutch inoperative without the necessity of shifting the gears to neutral.

It is well known that with the use of heavy tractors the tractor must be stopped in order to shift from one speed to another, and that when the tractor is stopped for a short while it is necessary to shift the gears into neutral in order to have the tractor remain stationary. The shifting of gears in a tractor is more or less inconvenient, and also causes a wearing and tearing of the gears. It is especially inconvenient to have to throw the clutch out of engagement, shift the gears and then throw the clutch into engagement again every time the operator desires to leave the tractor for a moment or two.

With the use of my device when the tractor is running with the gears in the desired speed and the operator desires to leave the tractor for a moment, he simply moves the clutch lever to position to render the clutch inoperative, and it is not necessary for him to shift the gears into neutral. When the operator wishes to start the tractor again, all that is necessary is to release the clutch lever control from engagement with the notched sector, thereby allowing the clutch to again become in engagement and the tractor to resume its movement.

It will readily be seen that this is an important advantage, as it is not necessary to shift the gears at all during the stopping and starting of the tractor.

Another advantage of my device is due to the fact that the pulley wheel is ordinarily put in operation as soon as the engine is started, and in order to put a belt on it the services of two men are required; one to hold the clutch lever in a position to render the clutch inoperative, to stop the movement of the pulley wheel, so that the other can place the belt on the pulley wheel.

With my device the operator merely places the clutch lever control in position to render the clutch inoperative, starts the engine, which in this case does not operate the pulley wheel, places the belt around the pulley wheel and then releases the clutch locking device, thereby starting the rotation of the pulley wheel.

Some changes may be made in the construction and arrangement of the various parts of my device without departing from the essential features and purposes of my invention, and it is my intention to cover by my claims any modified forms of structure or use of mechanical equivalents which may be reasonably included within their scope.

I claim as my invention:

1. In a device of the class described, a clutch lever, a foot pedal thereon, an adjustable locking device mounted on said lever, a coacting locking device, means for normally holding said locking device in position for holding said lever in any of its adjusted positions, against movement in one direction, and a member on said movable locking device adapted to be engaged by the foot whereby the foot pedal is operated for moving said locking members out of operative engagement, and means for holding said movable locking device in inoperative position, whereby said clutch lever may be operated independent of said locking device.

2. A clutch control lever; a foot pedal thereon; a movable locking device mounted on said lever adjacent to said foot pedal; a coacting locking device, whereby the lever may be locked in any of its adjusted positions, said movable locking device including a member adapted to be engaged by the foot for moving said locking devices out of operative engagement, and means adapted to be automatically actuated by movement of said last described member for holding said movable locking device in inoperative position.

3. In a device of the class described; the combination of a clutch lever with a foot pedal thereon; with a movable locking device; a coacting locking device; means tending to hold said locking devices in coacting engagement in any position of the clutch lever for holding the clutch member against movement in one direction; a foot pedal device on said movable locking member adapted to be engaged by the foot, said foot pedal being capable of slight pivotal movement relative to said movable locking device, and means adapted to be automatically actuated by movement of said last described member for holding said movable locking device in inoperative position.

4. In a device of the class described, the combination of a locking lever, a notched bar, a pawl arranged in operative position with relation to said locking lever, and a yielding device operatively connected with said pawl, said pawl being capable of adjustment to position where said yielding device tends to hold the pawl in engaging position with relation to the notches of said bar, and also of adjustment to position where said yielding device tends to hold the pawl out of engagement with said notches.

5. In a device of the class described, the combination of a locking lever, a notched bar, a pawl arranged in operative position with relation to said locking lever, and a yielding device operatively connected with said pawl, said pawl being capable of adjustment to position where said yielding device tends to hold the pawl in engaging position with relation to the notches of said bar, and also of adjustment to position where said yielding device tends to hold the pawl out of engagement with said notches, said lever having a foot pedal, said pawl having a portion adjacent to the foot pedal and adapted to be operated by the foot in connection with the operation of the foot pedal.

6. In a device of the class described, the combination of an operating lever, with a notched sector fixed in operative position with relation to said lever, a pawl pivotally supported on said lever, and a yielding device arranged in coöperation with said pawl, said pawl being adapted to be adjusted to different positions with relation to said yielding device, whereby in one position the pawl will be normally yieldingly held in engagement with the sector and in another position the pawl will be normally yieldingly held out of engagement with the sector.

7. In a device of the class described, the combination of an operating lever, with an engaging member fixed adjacent to said lever, a locking device carried by said lever and adapted to be normally yieldingly held in engagement with said engaging member, a spring, said locking device being capable of movement to different positions with relation to said spring, whereby in one position the spring will tend to hold the locking device in engagement with the engaging member, and in another position the spring will tend to hold the locking device out of such engagement.

8. In a device of the class described, the combination of a clutch control lever, means for holding said clutch control lever against movement in one direction, said last described means comprising a fixed notched sector, a locking means coacting with said sector, mounted on said clutch control lever, including a foot rest, a shaft below said foot rest having a screw-threaded portion, a nut on said portion having recesses, a pawl pivoted on said shaft adjacent to said nut to coact with said sector, projecting portions designed to be received in said recesses, and means for yieldingly holding said projecting portions in said recesses.

9. In a device of the class described, the combination of a clutch control lever, means for holding said clutch control lever against movement in one direction, said last described means comprising a fixed notched sector, a locking means coacting with said sector, mounted on said clutch control lever, including a foot rest, a shaft below said foot rest having a screw-threaded portion, a nut on said portion having recesses, a pawl pivoted on said shaft adjacent to said nut to coact with said sector, projecting portions designed to be received in said recesses, means for yieldingly holding said projecting portions in said recesses, and means for changing the position of said recesses and projections relative to each other.

10. In a device of the class described, the combination of a clutch control lever, means for holding said clutch control lever against movement in one direction, said last described means comprising a fixed notched sector, a locking means coacting with said sector, mounted on said clutch control lever, including a foot rest, a shaft below said foot rest having a screw-threaded portion, a nut on said portion having recesses, a pawl pivoted on said shaft adjacent to said nut to coact with said sector, projecting portions designed to be received in said recesses, means for yieldingly holding said projecting portions in said recesses, and a foot actuated member for changing the position of said recesses and projections relative to each other.

Des Moines, Iowa, April 14, 1919.

BURTON A. SPINNEY.